United States Patent [19]
Balanovsky et al.

[11] Patent Number: 5,756,935
[45] Date of Patent: May 26, 1998

[54] SCREWLESS SEIZURE BYPASS PLATFORM

[75] Inventors: Lev J. Balanovsky, Richboro; Richard M. Gresko, Huntingdon Valley, both of Pa.

[73] Assignee: NextLevel Systems, Inc., Hatboro, Pa.

[21] Appl. No.: 541,014

[22] Filed: Oct. 6, 1995

[51] Int. Cl.⁶ .............................. H02G 3/08; H01R 33/96; H01P 1/10
[52] U.S. Cl. ...................... 174/52.1; 200/51.09; 333/100
[58] Field of Search .................... 174/52.1, 52.4, 174/59, 60; 361/661, 662; 200/16 B, 16 C, 16 D, 51 R, 51.09, 51.1; 333/100, 105, 132, 134

[56] References Cited

U.S. PATENT DOCUMENTS

| | | | |
|---|---|---|---|
| 3,132,289 | 5/1964 | Russo | 317/108 |
| 3,134,931 | 5/1964 | Kobryner | 317/104 |
| 3,171,909 | 3/1965 | Foskett | 200/51.1 |
| 3,617,811 | 11/1971 | McVoy | 174/59 |
| 3,643,209 | 2/1972 | Coston | 339/155 R |
| 3,764,956 | 10/1973 | Norden | 339/74 R |
| 3,768,063 | 10/1973 | Coffman | 439/578 |
| 3,881,160 | 4/1975 | Ross | 200/51.1 |
| 3,895,318 | 7/1975 | Ross | 200/51.1 |
| 3,914,564 | 10/1975 | Reed et al. | 200/51.1 |
| 3,962,610 | 6/1976 | Reed et al. | 317/108 |
| 4,388,670 | 6/1983 | Billhartz | 361/367 |
| 4,660,921 | 4/1987 | Hauver | 439/578 |
| 4,755,776 | 7/1988 | Preschutti | 333/100 |

*Primary Examiner*—Teresa J. Walberg
*Assistant Examiner*—Sam Paik
*Attorney, Agent, or Firm*—Volpe and Koenig, P.C.

[57] ABSTRACT

A screwless bypass for cable signal tap is provided to prevent interruption of a cable signal when the tap cover is removed. The bypass means comprises a flexible spring leaf, compressible collets and end terminals. Contacts are released so that the spring leaf contacts a pair of end terminals to complete a signal path between the ends of the tap.

16 Claims, 11 Drawing Sheets

SCREWLESS SEIZURE BYPASS PLATFORM

BACKGROUND OF THE INVENTION

1. Field of the Invention

The present invention relates to cable television transmission components. More particularly, the invention relates to a screwless bypass platform which prevents interruption of the cable signal to downstream subscribers during servicing of a cable television tap.

2. Description of Related Art

Cable television (CATV) services are provided to subscribers through transmission networks that include taps, splitters, amplifiers and other equipment that distribute CATV service and ensures that the CATV signal quality is maintained. In particular, taps reside along the network to provide access outlets for localized subscribers.

The CATV signals are typically routed through a printed circuit board attached to the tap cover to provide CATV access to a plurality of subscribers at a single point. These taps require periodic maintenance and repair, and there is typically no provision for providing uninterrupted services to downstream subscribers when the cover of the tap is removed for servicing. Accordingly, removal of the cover results in interruption of service to downstream subscribers. Because of the increasing reliance upon the CATV system for lifesaving and other data critical applications, even a momentary signal interruption is undesirable.

There are known devices which provide a bypass during servicing of electrical equipment. For example, U.S. Pat. No. 3,132,289 shows a manual bypass device which provides a shorting link between line terminal, load terminal and the meter socket during removal of a meter. The connection is manually movable into two positions, a shorting position and a non-shorting position, upon turning of a selector screw. Additionally, U.S. Pat. No. 3,914,564 discloses a socket for watthour meter with an automatic bypass means. The bypass includes a spring loaded bridging contact which completes a circuit when the meter is removed.

The devices used in the electric utility industry are generally too expensive to implement on a CATV system. Since the removal of taps for servicing is performed infrequently, the cost of the bypass device must be limited in order to justify its use in normal installation. Additionally, since these devices typically transmit power and are not concerned with signal quality, they suffer from induced interference caused from creation of an open circuit between conductive contact points. When the signal conductors are separated, an induced capacitance effect results. The frequencies used in CATV systems to transmit video signals may be as high as 1 GHz, thereby exacerbating the capacitance effect. This effect may distort the signal flowing through the device and interfere with the signals being transmitted over the CATV system. Thus, it is desirable to have a device which eliminates interference caused by the induced capacitance effect.

Most current CATV taps typically use screws to mechanically maintain the connection between the taps and input/output (I/O) connectors. Such screws have a tendency to loosen over time. The stress of repeated connecting and disconnecting, as well as environment stresses, contributes to the loosening of the connections. If the screws are not periodically tightened, signal degradation or loss may result.

In order to increase the reliability of cable television taps and to provide for uninterrupted service during maintenance, it is desirable to have a low cost bypass device which is resistant to radio frequency interference and requires minimal maintenance.

SUMMARY OF THE INVENTION

The present invention provides a screwless seizure bypass platform for providing uninterrupted service to downstream subscribers during servicing or testing of a tap device. The bypass platform comprises a flexible spring leaf bypass conductor and actuator which is engaged by removal of the tap cover to provide uninterrupted service to downstream subscribers. When the tap cover is replaced, the actuator is disengaged and the spring leaf bypass conductor is grounded, thereby eliminating any radio frequency (RF) interference that may otherwise occur at high frequencies with an ungrounded conductor.

Accordingly, it is an object of the invention to provide a bypass platform which provides uninterrupted service to downstream subscribers during removal of the tap cover for servicing.

It is a further object of the invention to relieve the need for screw-based connectors to couple the platform with the CATV transmission network.

It is a further object of the invention to provide a cost efficient bypass which can be retrofitted to existing devices.

Other objects and advantages of this system will become apparent to those skilled in the art after reading the detailed description of the presently preferred embodiment.

DETAILED DESCRIPTION OF THE PREFERRED EMBODIMENT

The preferred embodiment will be described with reference to drawing figures where the numerals represent like elements throughout.

Figure 1:
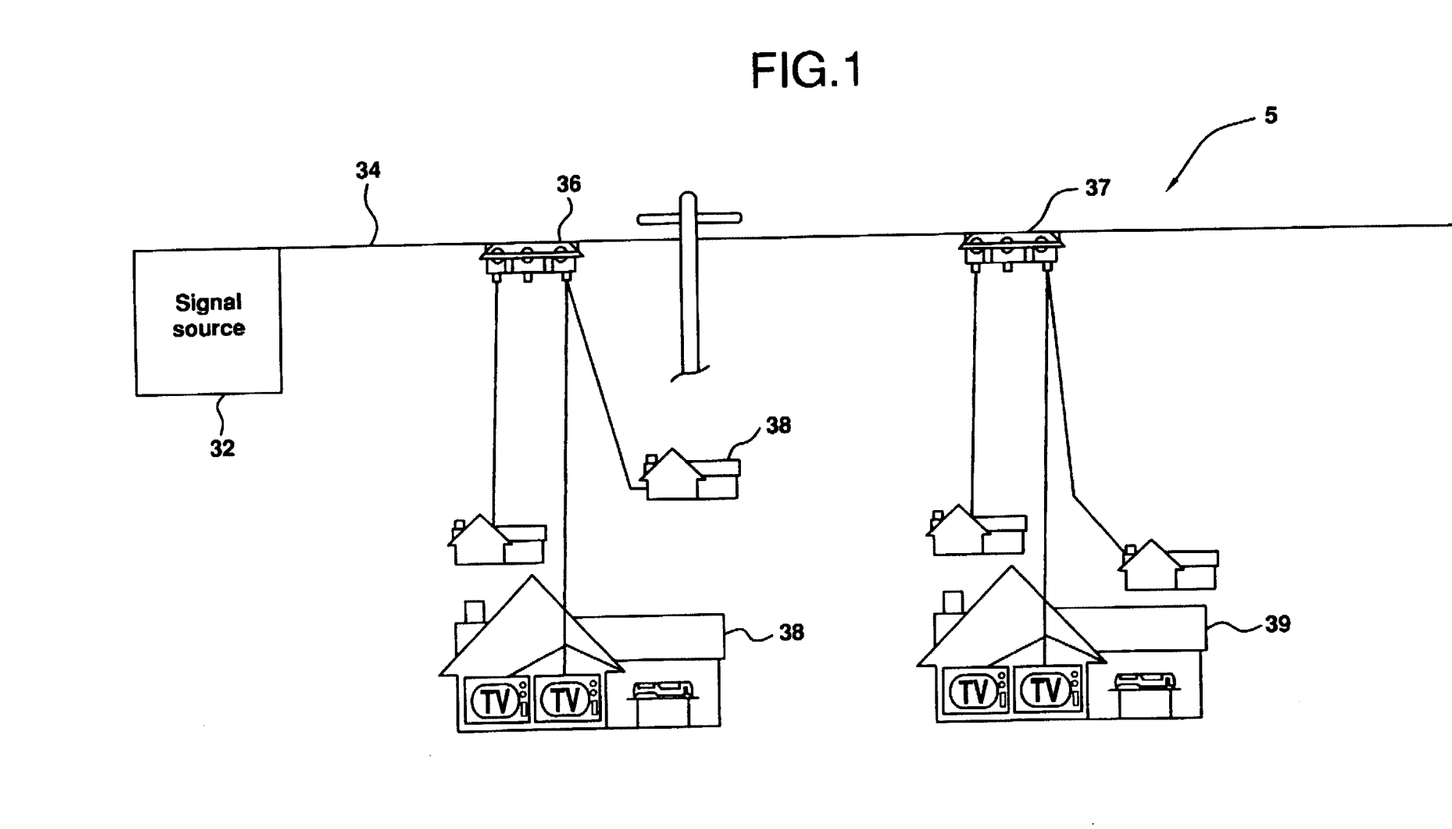
FIG. 1 is an overall system block diagram of a typical cable television system.

FIG. 1 is a block diagram of a cable television network 5. Cable television network 5 as used herein refers to all systems involving the transmission of television signals from the headend 32 over a transmission medium, such as fiber optic cable or coaxial cable. The transmission line 34 provides cable signals to subscribers 38, 39 at remote locations. The subscribers 38, 39 receive signals through taps 36, 37 placed along the transmission line 34. Each tap 36, 37 typically provides a connection to four or more subscribers. Periodically, the taps 36, 37 require servicing due to malfunctioning of the tap 36, 37 or to connect or disconnect subscribers 38, 39. However, servicing of a tap 36, 37 results in interruption of the cable signal over the transmission line 34 to subscribers downstream from that tap. For example, servicing of the tap 36 not only results in interruption of service to the subscribers 38 who are fed from that tap 36, but also subscribers 39 who access the CATV network 5 through the downstream tap 37.

Figure 2A:
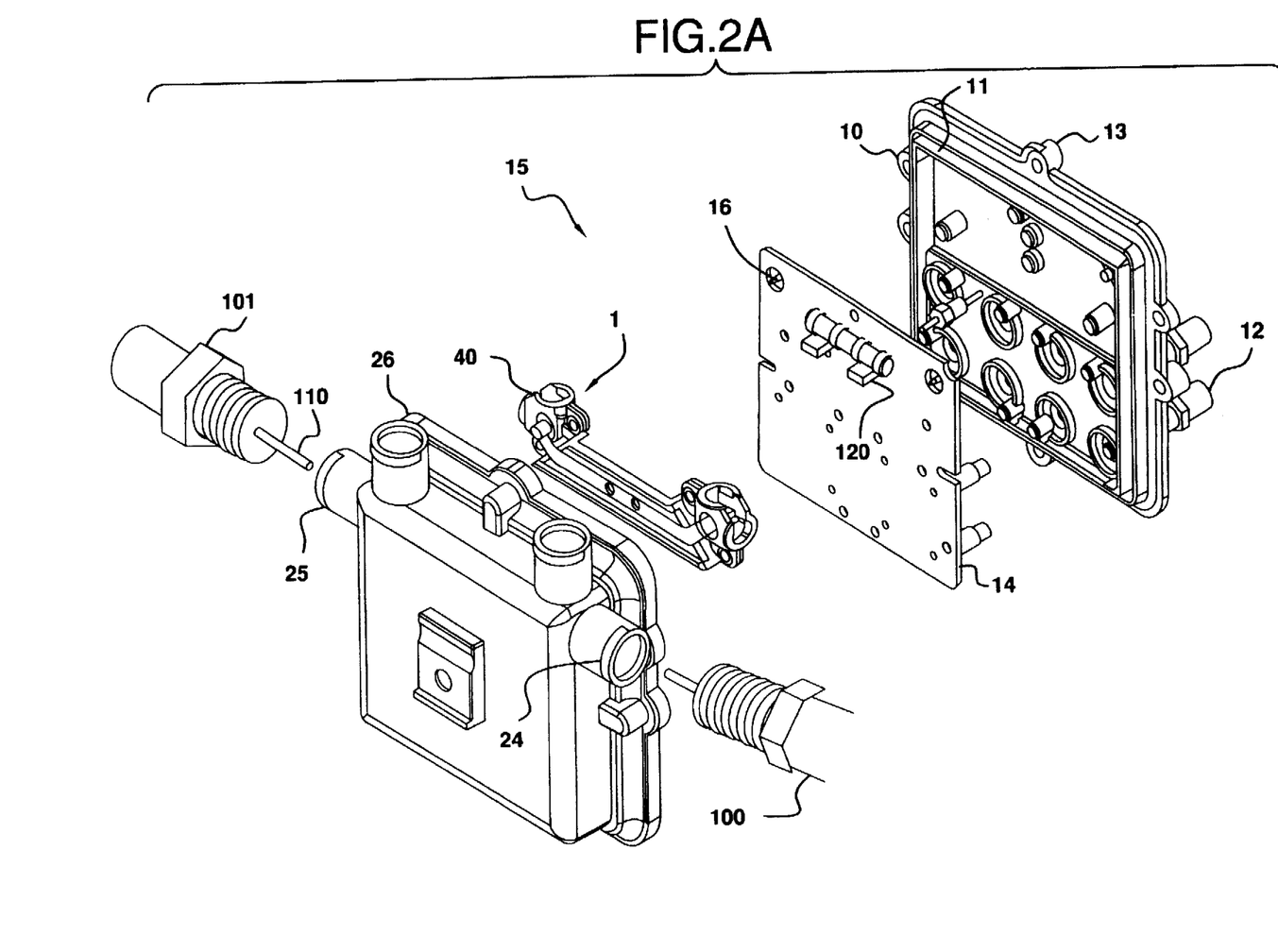
FIG. 2A is a perspective view of a preferred embodiment of the invention.

Referring to FIG. 2A, a screwless bypass platform 1 is shown in a CATV multiple tap 15. The multiple tap 15 includes a tap cover 10, a printed circuit board 14, a bypass platform 1 and a main housing 26. The tap cover 10 is provided with a plurality of tap outlets 12, each of which provides CATV service to a different subscriber. Although an eight-tap device is shown, it will be understood by those skilled in the art that any conventional multiple tap or single tap device may be used.

The main housing 26 includes threaded signal ports 24, 25 at opposing ends. The input signal port 24 is adapted to receive a signal input via a coaxial cable and connector 100. The output signal port 25 receives a signal output connector 101 for outputting the received signal to the downstream CATV network. The printed circuit board 14 is rigidly attached to the inside surface of the cover 10. A pair of signal receptors 22, 23 are provided on the back of printed circuit board 14. The printed circuit board 14 splits the signal received from the headend 32 among the subscribers fed from that tap and passes the signal through to subscribers fed from downstream taps. A detailed explanation of the function of the printed circuit board 14, which is well known to those skilled in the art, is outside the scope of the present invention.

A metal braid 11 surrounds the periphery of the printed circuit board 14 at the junction between the cover 10 and the main housing 26. The metal braid 11 provides an EMI/RFI trap for the printed circuit board 14.

Figure 2B:
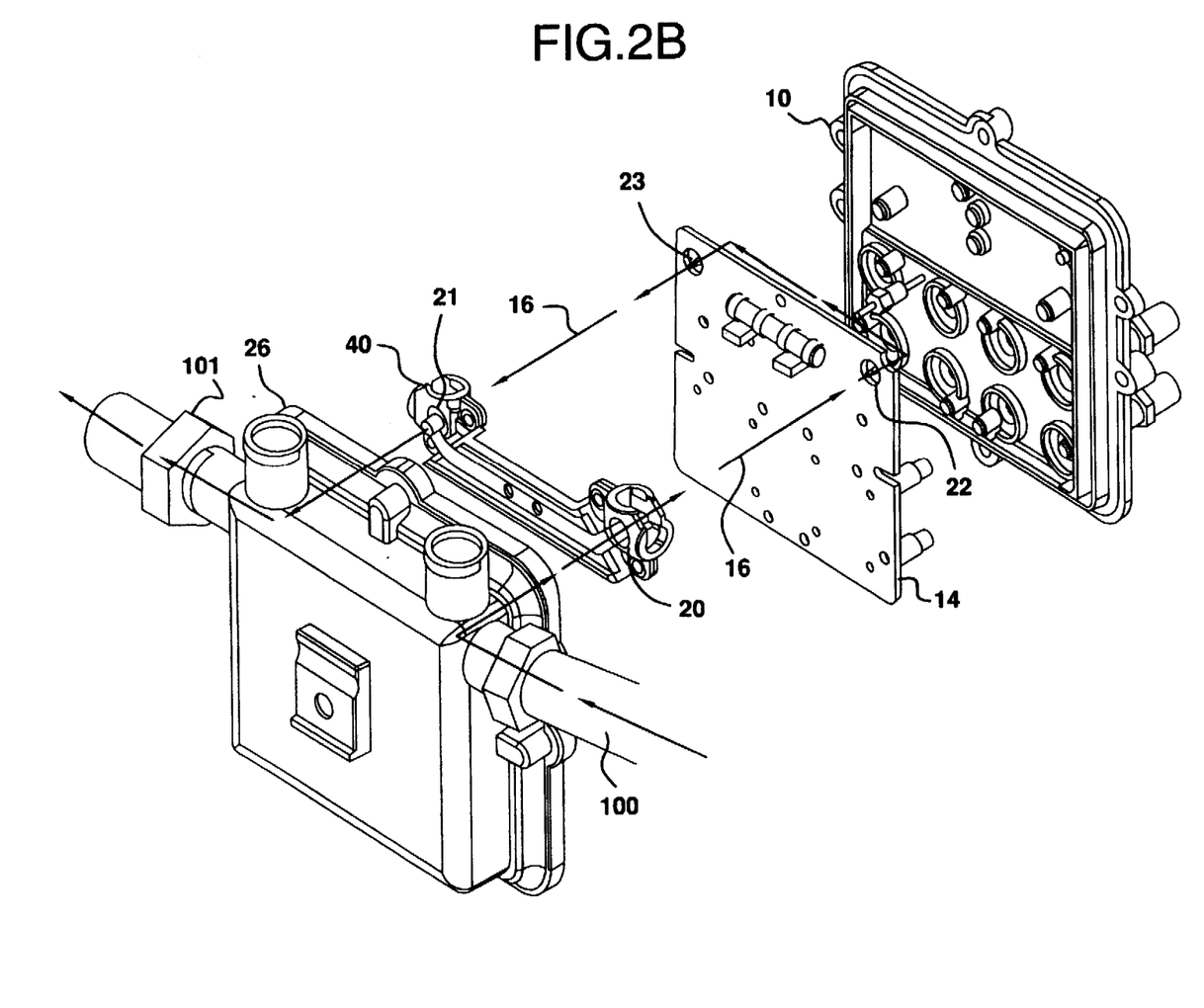
FIG. 2B is a perspective view of the signal path through the cable tap.

Referring to FIG. 2B, the signal path 16 for the CATV tap 15 is illustrated. When the cover 10 is installed, the signal, shown as line 16, originates from the signal input connector 100. The signal input 100 contacts a first terminal 20 and the signal flows from the conductor within signal input conductor 100 through the terminal 20. The terminal 20 is coupled to the first signal receptor 22 on the printed circuit board 14. The signal then flows through the printed circuit board 14 (and thus to each individual tap 12) and to the second signal receptor 23. The second signal receptor 23 is coupled to a second terminal 21 which contacts the conductor within signal output connector 101. The signal flows from the receptor 23, through the terminal 21, to the signal output connector 101.

When the cover 10 is removed for servicing the tap 15, the printed circuit board 14 is also removed. Accordingly, the signal path is open-circuited since the signal receptors 22, 23 no longer are connected to the terminals 20, 21. In a typical tap, this would prevent downstream subscribers 38, 39 from receiving the CATV signal.

Figure 2C:
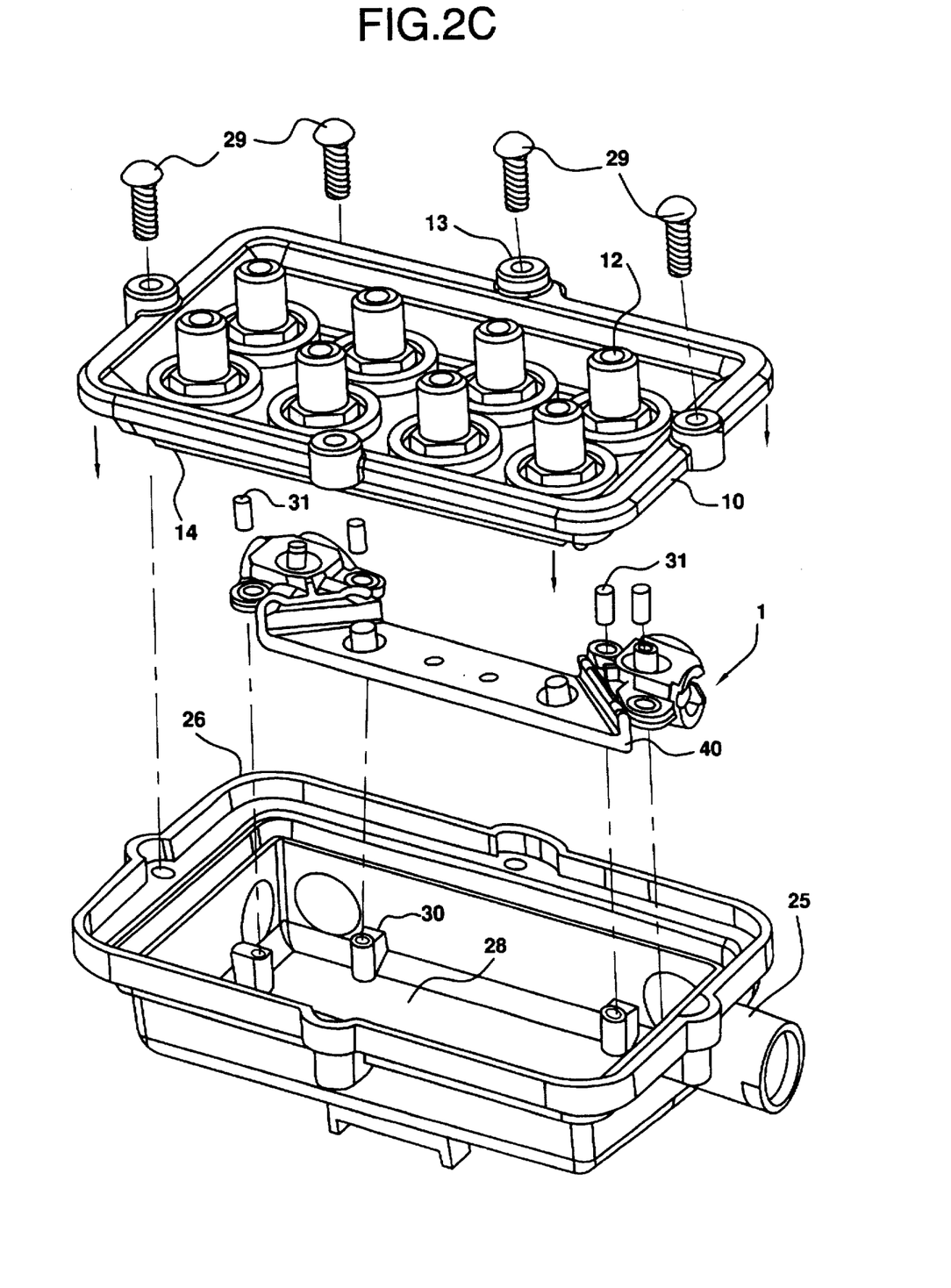
FIG. 2C is a perspective view of the signal cover, bypass platform and tap housing.

Referring to FIG. 2C, the preferred embodiment of the bypass platform 1 is shown. The printed circuit board 14 is attached to the inside surface of the tap cover 10. The bypass platform 1 is mounted onto the housing 26 with a plurality of screws 31, at threaded screw housings 30. The tap cover 10 and the printed circuit board 14 are secured to the main housing 26 by a plurality of cover screws 29, at connection points 13. Upon engagement of the cover 10, the signal is passed from the signal input port 24 through the printed circuit board 14 (and thus to each individual tap 12), and out through the output signal port 25, to downstream subscribers 38, 39.

Figure 3:
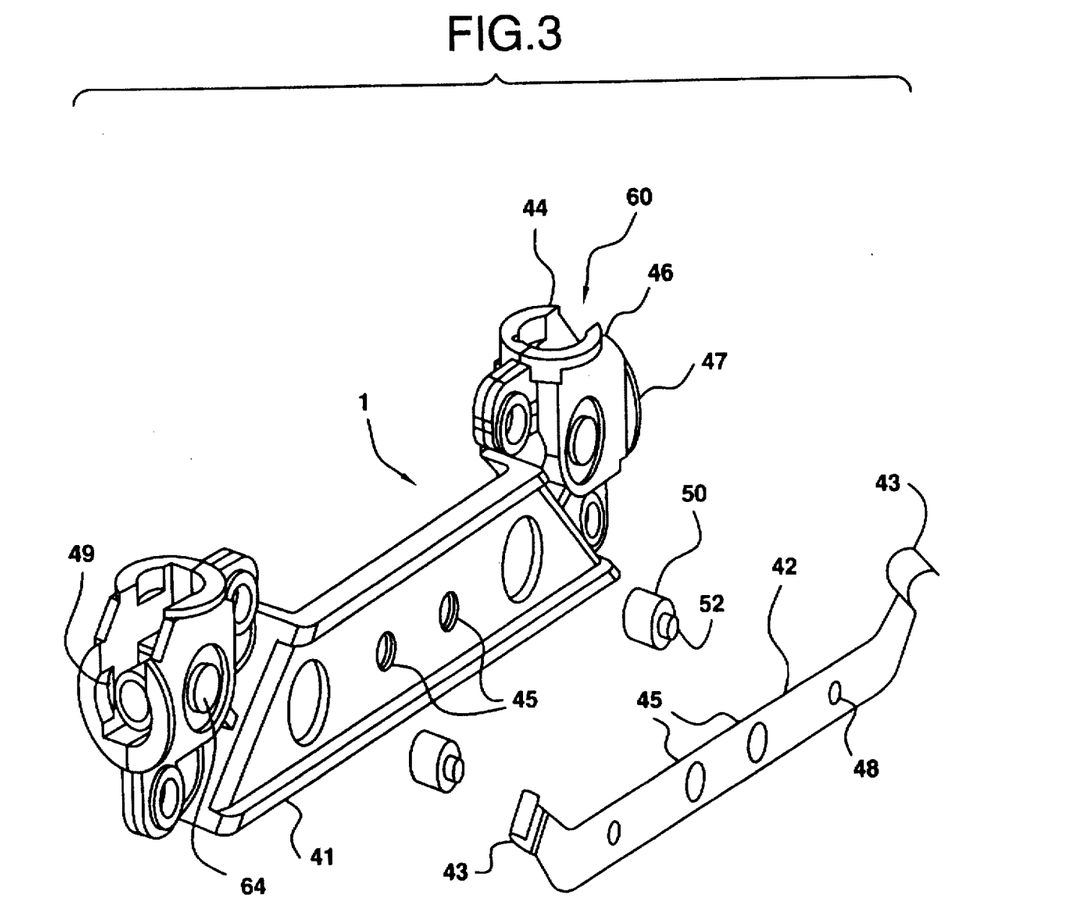
FIG. 3 is a perspective view of the bypass platform.

As shown in more detail in FIG. 3, the bypass platform 1 comprises a platform body 41 and terminal housing covers 44, which are attached to the ends 46 of the platform body 41. The platform body ends 46 are molded to complement the terminal housing covers 44. Rivets, not shown, join the terminal housing covers 44 to the platform body ends 46. The platform body ends 46 and the terminal housing covers 44 define openings 47, 49 which are adapted for receiving coaxial cable inputs. The openings 47, 49 are generally positioned to face in the direction of the signal ports 24, 25.

The platform body 41 also includes a bypass spring leaf 42. Contact bridges 43 are provided on both ends of the spring leaf 42 which curve outwardly from the spring leaf 42. The spring leaf 42 is secured to the platform body 41 at points 45 by rivets, not shown, which rigidly anchor the mid-section of spring leaf 42 at a central position to the platform body 41. Actuators 50 are interjected through apertures 48 on the spring leaf 42.

Figure 4:
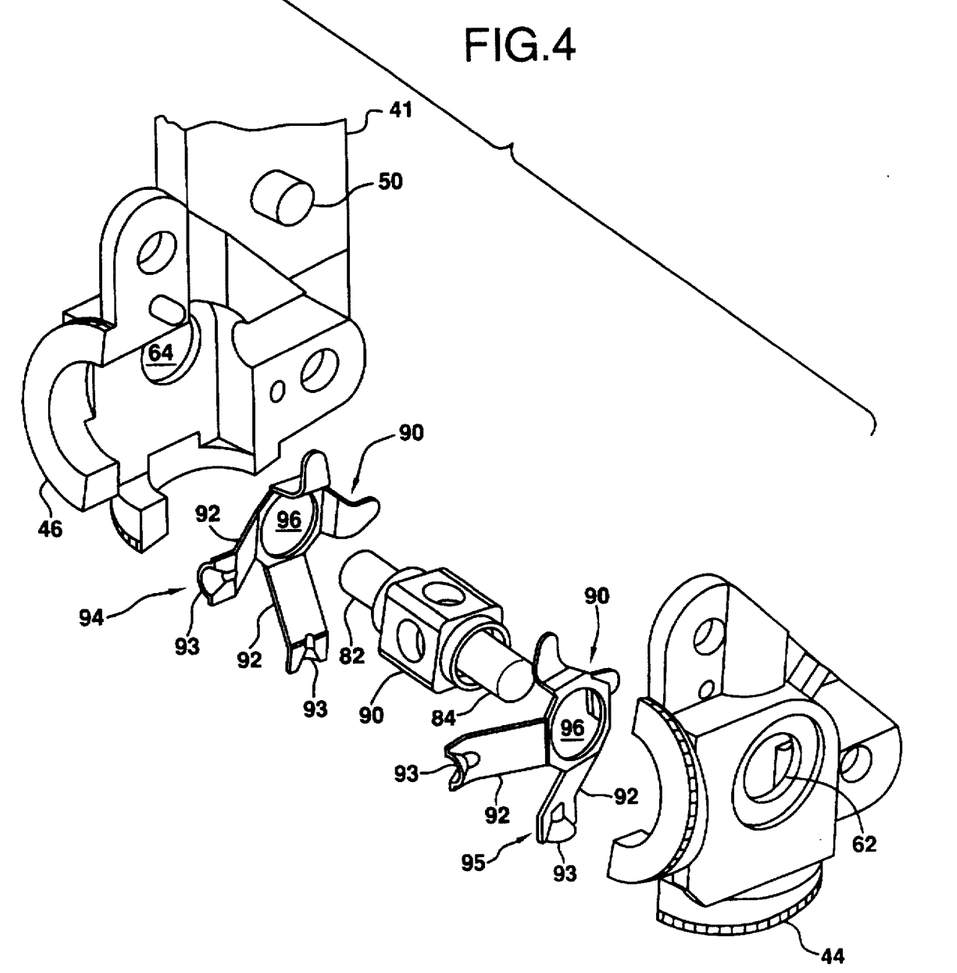
FIG. 4 is a perspective view of the terminal housing.

The ends 46 of the bypass platform 1 are shown in greater detail in FIG. 4. Contained within the platform body ends 46 and terminal covers 44 is a contact terminal 80, which has first and second terminal ends 82, 84 extending from opposing sides of the contact terminal 80. The first terminal end 84 projects through aperture 62 on the terminal cover 44. The second terminal end 82 projects through aperture 64 on the terminal housing end piece 46. In the preferred embodiment, terminal end 84 protrudes outward a distance substantially greater than terminal end 82.

Disposed between the terminal 80 and the terminal housing pieces 46 and 44 are stabilizing collets 90. The collets 90 include a plurality of receiving arms 92 which extend outwardly from central openings 96. The collets 90 are constructed of a flexible, electrically conductive material. The ends of arms 92 are molded into generally semi-circular shaped portions 93. The arms 92 are angled outward and away from the central openings 96. When the terminal cover 44 and terminal housing end piece 46 are riveted together, the arms 92 of the collets 90 are compressed by the inner walls of the housing cover 44 and housing end pieces 46 to form expandable couplers 94, 95. The couplers 94, 95, are generally aligned for receiving the center conductor of the signal input and output conductors 100, 101. The conductors are inserted through the couplers 94, 95 to align with contact terminals 80 and provide a strong mechanical connection. Upon insertion of the signal-input and output conductors, the couplers 94, 95 are forced slightly apart as the arms 92 of the collets 90 separate to accommodate the conductors. The couplers 94, 95 clamp the conductors to limit movement and provide a secure signal contact. Removal of the signal input and output conductors releases the couplers 94, 95, whereupon the arms 92 of the collets 90 spring back into contact.

Figure 5:
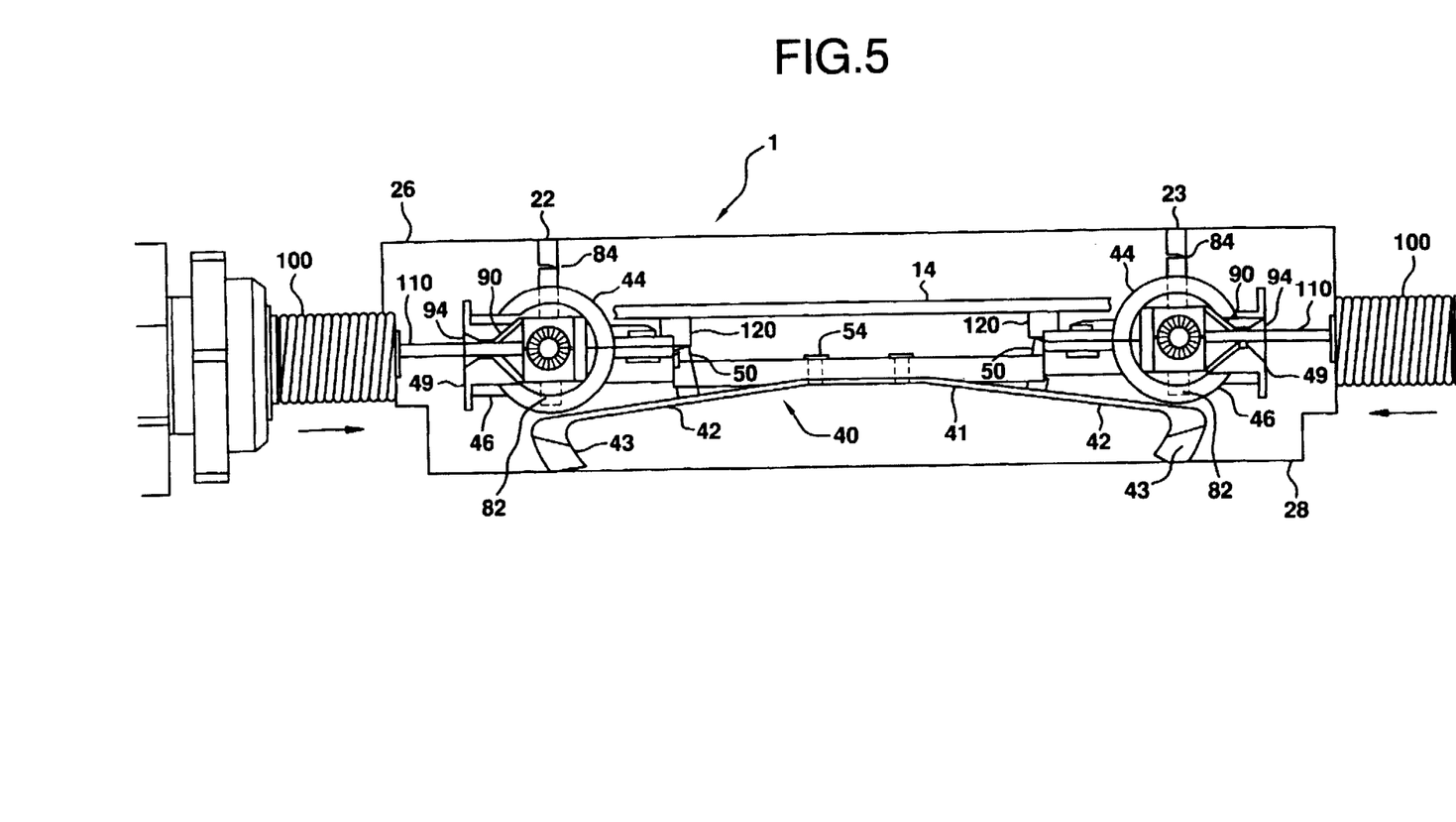
FIG. 5 is a side elevation view of the bypass platform in a first position.

FIG. 5 shows the position of the bypass platform 1 with the tap cover 10 installed. Two activating tabs 120, which are disposed on the cover 10, depress the actuating buttons 50 on the spring leaf 42. This forces the spring leaf 42 to bend downwardly such that the contact bridges 43 contact the back wall 28 of the main housing 26. The connection between the contact bridges 43 and the back wall 28 grounds the bypass platform 1, thereby preventing unwanted signal interference that would be otherwise caused by the induced capacitance effect between the contact bridges 43 and the terminal ends 82.

The terminal ends 84 extend outward to couple with signal receptors 22 and 23 on the printed circuit board 14. Accordingly, with the tap cover 10 installed, the CATV signal is conducted from the center conductor of the signal input connector 100 through the coupler 94, the terminal end 84, the first signal receptor 22, the printed circuit board 14, out through the second signal receptor 23, the terminal end 84, the coupler 94, and to the center conductor of the signal output connector 101.

Figure 6:
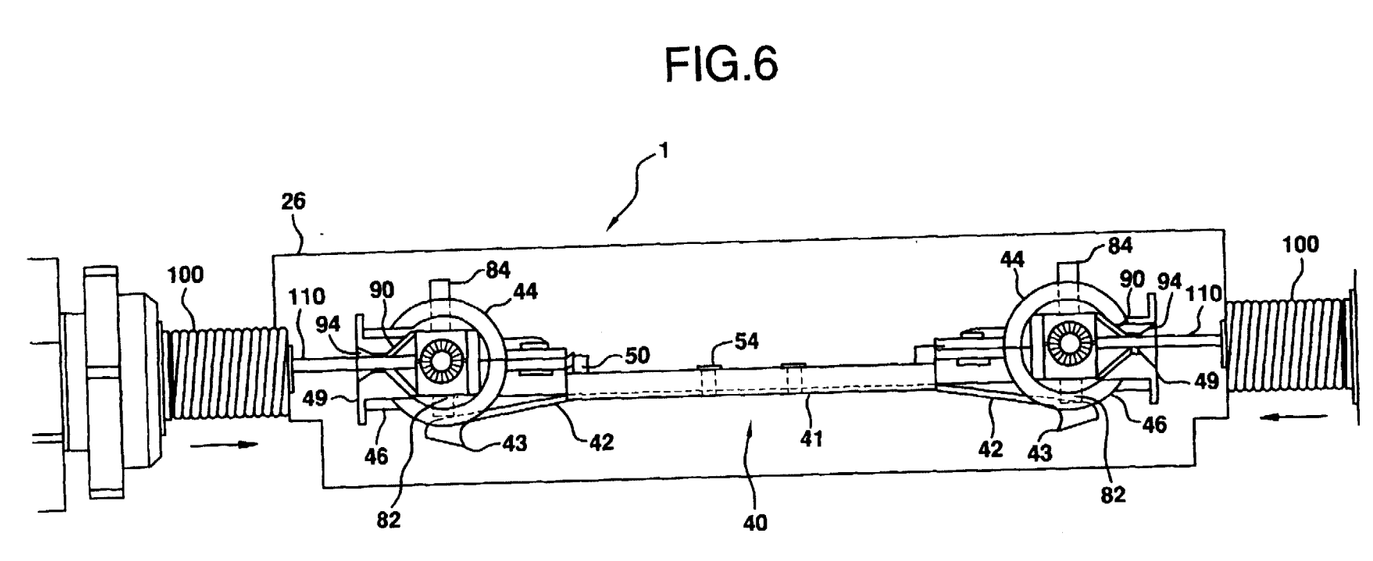
FIG. 6 is a side elevation view of the bypass platform in a second position.

As shown in FIG. 6, when the cover 10 and the printed circuit board 14 are removed, the activating tabs 120 no longer depress the actuators 50. Accordingly, the spring leaf 42 engages the terminal ends 82. The cable signal can then pass from one terminal end 82, through the spring leaf 42, into the opposing terminal end 82 to provide a closed circuit path for the cable signal to pass to downstream subscribers.

Figure 7:
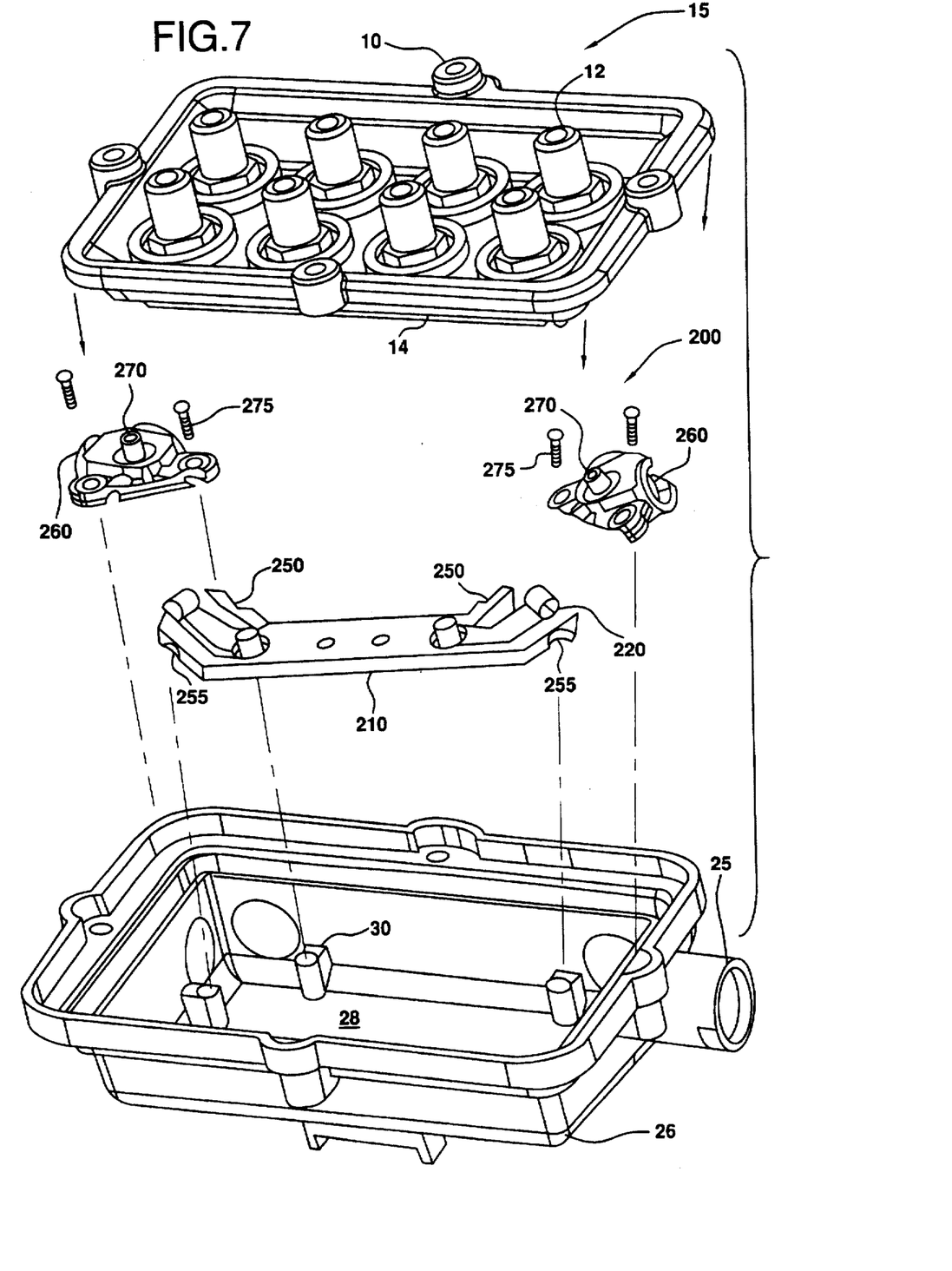
FIG. 7 is a perspective view of an alternative embodiment of the invention.

Although the preferred embodiment provides an effective screwless bypass platform, it may be impractical to install the device into existing taps since both signal input and output connectors 100, 101 must be removed in order to install the new bypass platform 1. For retrofit applications, the alternative embodiment of the invention shown in FIG. 7 may be utilized. In this embodiment, the bypass adaptor 200 is constructed for retrofitting existing CATV taps 15 by providing several sections which fit above and below the signal input/output conductors.

Figure 8:
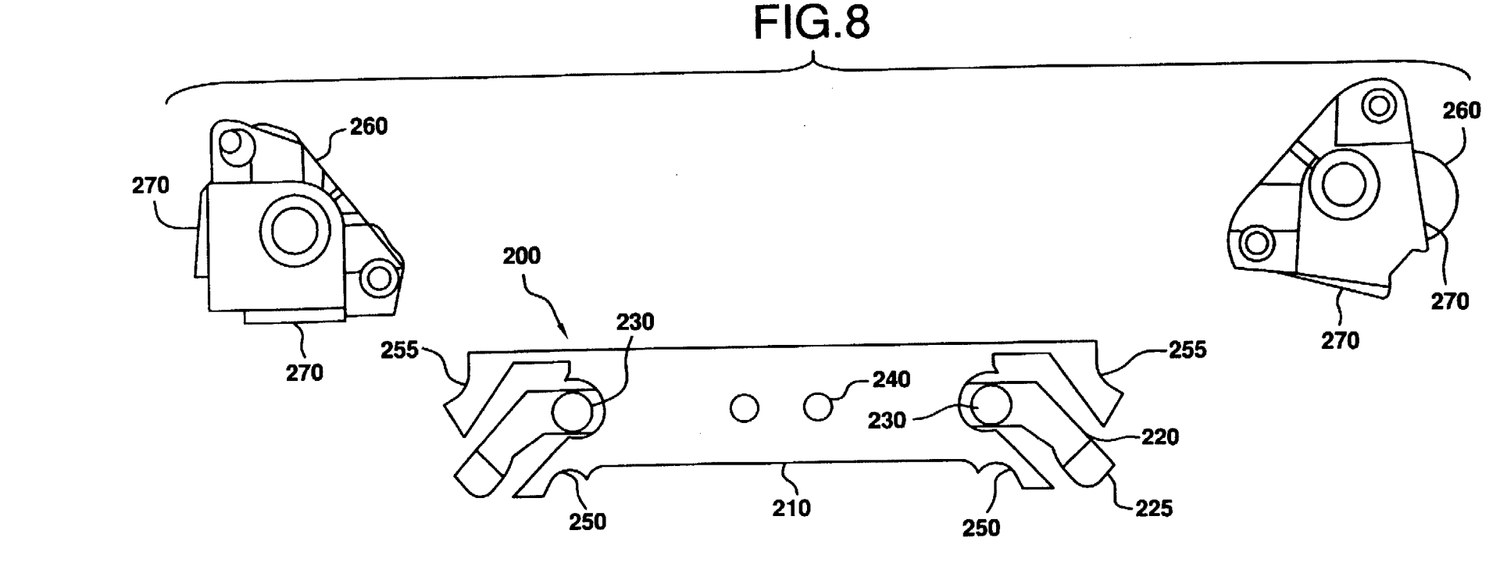
FIG. 8 is a rear plan view of the embodiment of FIG. 7.

Referring to FIG. 8, the bypass adaptor 200 comprises a body 210, a spring leaf 220, and two terminal housing pieces 260. The adaptor body 210 is preferably constructed of a flexible plastic material. Notches 250 and 255 are provided along the edges of the adaptor body 210 to complement the screw housings 30 along the back wall 28 of the housing 26. The flexible notches 250 and 255 secure the bypass adaptor 200 to the main housing 26.

Figure 9:
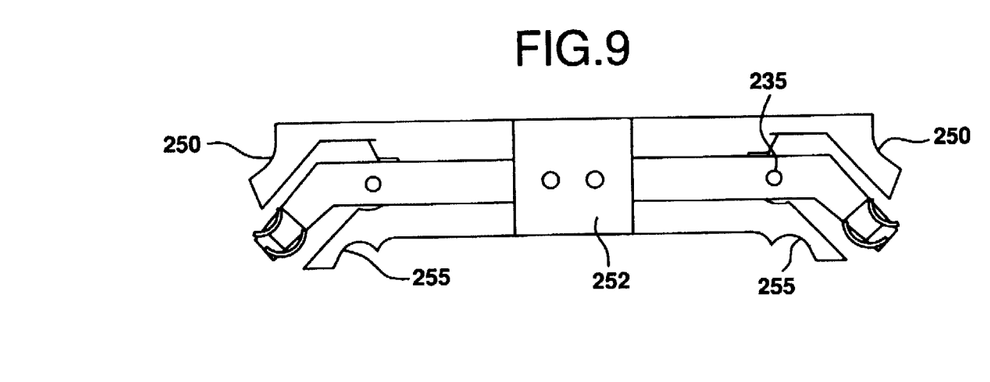
FIG. 9 is a front plan view of the embodiment of FIG. 7.

Referring to FIG. 9, the spring leaf 220 is attached to the adaptor body 210 by rivets 240 and secured by a backing piece 252. The spring leaf 220 is effectively hinged at its center by the rivets 240 and backing piece 250. Curved contact bridges 225 are disposed on both ends of the spring leaf 220.

Actuators 230 are also disposed on the spring leaf 220, which are positioned for engagement with activating tabs 120 displaced on the printed circuit board 14. The terminal housing pieces 260 contain the contact terminals 272 and the collets 280. The terminal housing pieces 260 form openings 270 which provide access in the main housing 26 for center conductors of signal input and output connectors 100, 110.

The operation of the alternative embodiment is the same as the preferred embodiment. Upon placement of the cover 10 and printed circuit board 14 in the main housing 26, the activating tabs 120 contact the actuators 230. Pressure on the actuators 230 forces the contact bridges 225 away from the contact terminals 272. Accordingly, the spring leaf 220 no longer conducts the CATV signal. When cover 10 and printed circuit board 14 are removed, the activating tabs 120 no longer contact the actuators 230. Accordingly, the spring leaf 220 is released into contact with contact terminals 272 to pass the CATV from the contact terminals 272 through the spring leaf 220.

Figure 10:
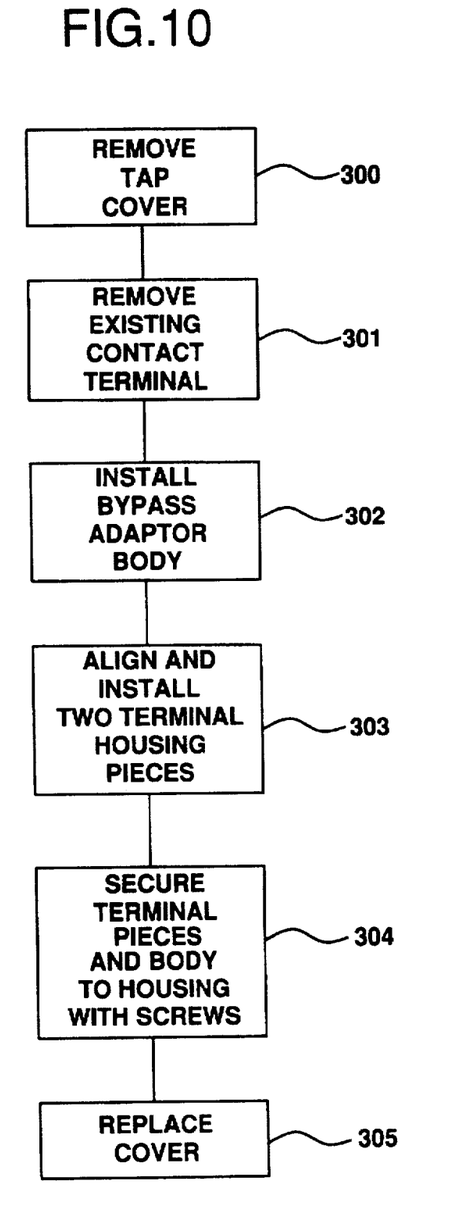
FIG. 10 is a flow chart of the retrofitting procedure.

The bypass adaptor 200 is retrofitted into an existing tap in accordance with the procedure of FIG. 10. The tap cover 10 is removed from the main housing 26 (Step 300), thereby interrupting the CATV signal during the retrofitting procedure. The existing contact terminals and terminal housings are then removed (Step 301) from the main housing 26. The bypass adaptor body 210 with the spring leaf 220 attached is then connected (Step 302) to the existing screw taps 30 of the main housing 26. The notches 250 and 255 disposed at the ends of the adaptor body 210 are fitted into the main housing 26. The auxiliary terminal housing pieces 260, containing contact terminals 272 and collets 280, are placed on top of the end portions of adaptor body 210 (Step 303). The auxiliary terminal housing pieces 260 should be aligned with the corresponding ports 24, 25 on the main housing 26. Alignment of the openings 270 with the ports 24, 25 is essential to provide an unobstructed path for the signal input/output conductors. The terminal housing pieces 260 are then fixed to the main housing 26 (Step 304) by screws 275 threaded into screw housings 30. The tap cover 10 is replaced and secured to the main housing 26 (Step 305).

Upon subsequent removal of the tap cover 10 from the main housing 26 with the bypass adaptor 200 installed, the cable signal will be maintained through the multiple CATV tap 15 to downstream subscribers.

While the present invention has been described in terms of the preferred embodiment, other variations which are within the scope of the invention as defined in the claims will be apparent to those skilled in the art.

We claim:

1. A CATV line device comprising:

an input port;

an output port;

board mounted circuitry which electrically couples said input port to said output port, said board mounted circuitry removably mounted within said device; and a bypass coupling member for electrically coupling said input port to said output port when said board mounted circuitry is removed, said bypass coupling member including a flexible spring means having first and second substantially curved contact means displaceable between a first position electrically coupling with said input and output ports and a second position electrically uncoupled with said first and second ports and the flexible spring means is grounded through contact with a surface of said CATV line device, said contact means being maintained in said second position when said board mounted circuitry is installed and said contacts being in said first position when said board mounted circuitry is removed.

2. The CATV line device of claim 1 wherein said line device is a multiple CATV tap.

3. The CATV line device of claim 1 wherein said spring means is a spring leaf means.

4. The CATV line device of claim 3 further comprising terminal means for coupling with said spring leaf means in said first position.

5. The CATV line device of claim 3 wherein said CATV line device is a multiple CATV tap.

6. The CATV line device of claim 3 further comprising binding collets for providing a friction coupling between said terminal means and said signal connectors, said binding collets have a plurality of expandable ends for receiving said signal connectors.

7. The CATV line device of claim 3 further comprising binding collets for providing a friction coupling between said terminal means and said signal connectors, said binding collets have a plurality of expandable ends for receiving said signal connectors.

8. The CATV line device of claim 7 wherein said collets are constructed of a flexible conducting material.

9. A method for modifying an existing CATV line device having a housing, board mounted circuitry, and contact terminals to maintain the integrity of a cable signal when board mounted circuitry is removed comprising the steps of:

removing said board mounted circuitry;

inserting a bypass coupling member into said housing, said bypass coupling member to be positioned behind said existing contact terminals, so that said contact ends of said bypass coupling member are placed substantially in alignment with said contact terminals to provide an adequate signal connection;

replacing said board mounted circuitry, whereby when said board mounted circuitry is subsequently removed, said cable signal is maintained by coupling of said bypass coupling member with said contact terminals.

10. The method of claim 9 wherein said CATV line device is a multiple CATV tap.

11. A method for modifying an existing CATV line device having a housing, board mounted circuitry, and contact terminals to maintain the integrity of a cable signal when board mounted circuitry is removed comprising the steps of:

removing said board mounted circuitry;

inserting a bypass coupling member into said housing, said bypass coupling member including flexible spring means having contact ends to be positioned behind said existing contact terminals, so that said contact ends of said bypass coupling member are placed substantially in alignment with said contact terminals, and said flexible spring means being positioned to contact a surface of said CATV line device, thus grounding said flexible spring means; and replacing said board mounted circuitry, whereby when said board mounted circuitry is subsequently removed, said cable signal is maintained by coupling of said contact ends with said contact terminals so that said spring leaf means conducts a CATV signal.

12. A two position bypass switching adaptor means selectively configured to fit within an existing CATV line device with board mounted circuitry and input and output ports comprising:

a bypass coupling member for electrically coupling said input port to said output port when said board mounted circuitry is removed, said bypass coupling member having first and second contact means displaceable between a first position electrically coupling with said input and output ports and a second position electrically uncoupled with said first and second ports, said contact means being maintained in said second position when said board mounted circuitry is installed and said contacts being in said first position when said board mounted circuitry is removed; and engaging means for biasing said contact means between said first and said positions.

13. The two position bypass switching adaptor means of claim 12 wherein said CATV line device is a multiple CATV tap.

14. A two position bypass switching adaptor means selectively configured to fit within an existing CATV line device with board mounted circuitry and input and output ports comprising:

a bypass coupling member for electrically coupling said input port to said output port when said board mounted circuitry is removed, said bypass coupling member having first and second contact means displaceable between a first position electrically coupling with said input and output ports and a second position electrically uncoupled with said first and second ports, said contact means being maintained in said second position when said board mounted circuitry is installed and said contacts being in said first position when said board mounted circuitry is removed; and engaging means for biasing said contact means between said first and second positions wherein said contact ends are positioned to contact a rear surface of said CATV line device in said second position.

15. The two position bypass switching adaptor means of claim 12 further comprising:

terminal means positioned in alignment with said spring leaf means.

16. The two position bypass switching adaptor means of claim 12 wherein said engaging means includes a plurality of tabs disposed on said board mounted circuitry.

* * * * *

UNITED STATES PATENT AND TRADEMARK OFFICE
CERTIFICATE OF CORRECTION

PATENT NO. : 5,756,935
DATED : May 26, 1998
INVENTOR(S) : Lev J. Balanovsky, et. al.

It is certified that error appears in the above-identified patent and that said Letters Patent is hereby corrected as shown below:

Columns 5-8 should be deleted to appear as per attached columns.

Signed and Sealed this

Eleventh Day of January, 2000

Attest:

Q. TODD DICKINSON

Attesting Officer

Acting Commissioner of Patents and Trademarks

The terminal ends 84 extend outward to couple with signal receptors 22 and 23 on the printed circuit board 14. Accordingly, with the tap cover 10 installed, the CATV signal is conducted from the center conductor of the signal input connector 100 through the coupler 94, the terminal end 84, the first signal receptor 22, the printed circuit board 14, out through the second signal receptor 23, the terminal end 84, the coupler 94, and to the center conductor of the signal output connector 101.

As shown in FIG. 6, when the cover 10 and the printed circuit board 14 are removed, the activating tabs 120 no longer depress the actuators 50. Accordingly, the spring leaf 42 engages the terminal ends 82. The cable signal can then pass from one terminal end 82, through the spring leaf 42, into the opposing terminal end 82 to provide a closed circuit path for the cable signal to pass to downstream subscribers.

Although the preferred embodiment provides an effective screwless bypass platform, it may be impractical to install the device into existing taps since both signal input and output connectors 100, 101 must be removed in order to install the new bypass platform 1. For retrofit applications, the alternative embodiment of the invention shown in FIG. 7 may be utilized. In this embodiment, the bypass adaptor 200 is constructed for retrofitting existing CATV taps 15 by providing several sections which fit above and below the signal input/output conductors.

Referring to FIG. 8, the bypass adaptor 200 comprises a body 210, a spring leaf 220, and two terminal housing pieces 260. The adaptor body 210 is preferably constructed of a flexible plastic material. Notches 250 and 255 are provided along the edges of the adaptor body 210 to complement the screw housings 30 along the back wall 28 of the housing 26. The flexible notches 250 and 255 secure the bypass adaptor 200 to the main housing 26.

Referring to FIG. 9, the spring leaf 220 is attached to the adaptor body 210 by rivets 240 and secured by a backing piece 252. The spring leaf 220 is effectively hinged at its center by the rivets 240 and backing piece 250. Curved contact bridges 225 are disposed on both ends of the spring leaf 220.

Actuators 230 are also disposed on the spring leaf 220, which are positioned for engagement with activating tabs 120 displaced on the printed circuit board 14. The terminal housing pieces 260 contain the contact terminals 272 and the collets 280. The terminal housing pieces 260 form openings 270 which provide access in the main housing 26 for center conductors of signal input and output connectors 100, 110.

The operation of the alternative embodiment is the same as the preferred embodiment. Upon placement of the cover 10 and printed circuit board 14 in the main housing 26, the activating tabs 120 contact the actuators 230. Pressure on the actuators 230 forces the contact bridges 225 away from the contact terminals 272. Accordingly, the spring leaf 220 no longer conducts the CATV signal. When cover 10 and printed circuit board 14 are removed, the activating tabs 120 no longer contact the actuators 230. Accordingly, the spring leaf 220 is released into contact with contact terminals 272 to pass the CATV from the contact terminals 272 through the spring leaf 220.

The bypass adaptor 200 is retrofitted into an existing tap in accordance with the procedure of FIG. 10. The tap cover 10 is removed from the main housing 26 (Step 300), thereby interrupting the CATV signal during the retrofitting procedure. The existing contact terminals and terminal housings are then removed (Step 301) from the main housing 26. The bypass adaptor body 210 with the spring leaf 220 attached is then connected (Step 302) to the existing screw taps 30 of the main housing 26. The notches 250 and 255 disposed at the ends of the adaptor body 210 are fitted into the main housing 26. The auxiliary terminal housing pieces 260, containing contact terminals 272 and collets 280, are placed on top of the end portions of adaptor body 210 (Step 303). The auxiliary terminal housing pieces 260 should be aligned with the corresponding ports 24, 25 on the main housing 26. Alignment of the openings 270 with the ports 24, 25 is essential to provide an unobstructed path for the signal input/output conductors. The terminal housing pieces 260 are then fixed to the main housing 26 (Step 304) by screws 275 threaded into screw housings 30. The tap cover 10 is replaced and secured to the main housing 26 (Step 305).

Upon subsequent removal of the tap cover 10 from the main housing 26 with the bypass adaptor 200 installed, the cable signal will be maintained through the multiple CATV tap 15 to downstream subscribers.

While the present invention has been described in terms of the preferred embodiment, other variations which are within the scope of the invention as defined in the claims will be apparent to those skilled in the art.

We claim:

1. A CATV line device comprising:
   an input port;
   an output port;
   board mounted circuitry which electrically couples said input port to said output port, said board mounted circuitry removably mounted within said device; and
   a bypass coupling member for electrically coupling said input port to said output port when said board mounted circuitry is removed, said bypass coupling member including a flexible spring means having first and second substantially curved contact means displaceable between a first position electrically coupling with said input and output ports and a second position electrically uncoupled with said first and second ports and the flexible spring means is grounded through contact with a surface of said CATV line device, said contact means being maintained in said second position when said board mounted circuitry is installed and said contacts being in said first position when said board mounted circuitry is removed.

2. The CATV line device of claim 1 wherein said line device is a multiple CATV tap.

3. The CATV line device of claim 1 wherein said spring means is a spring leaf means.

4. The CATV line device of claim 3 further comprising terminal means for coupling with said spring leaf means in said first position.

5. The CATV line device of claim 3 wherein said CATV line device is a multiple CATV tap.

6. The CATV line device of claim 3 further comprising binding collets for providing a friction coupling between said terminal means and said signal connectors, said binding collets have a plurality of expandable ends for receiving said signal connectors.

7. The CATV line device of claim 4 wherein said terminal means is provided with a plurality of receiving ends for engagement with said signal connectors.

8. The CATV line device of claim 7 wherein said collets are constructed of a flexible conducting material.

9. A method for modifying an existing CATV line device having a housing, board mounted circuitry, and contact terminals to maintain the integrity of a cable signal when board mounted circuitry is removed comprising the steps of:

removing said board mounted circuitry;

inserting a bypass coupling member into said housing, said bypass coupling member including flexible spring means having contact ends to be positioned behind said existing contact terminals, so that said contact ends of said bypass coupling member are placed substantially in alignment with said contact terminals, and said flexible spring means being positioned to contact a surface of said CATV line device, thus grounding said flexible spring means; and replacing said board mounted circuitry, whereby when said board mounted circuitry is subsequently removed, said cable signal is maintained by coupling of said contact ends with said contact terminals so that said spring leaf means conducts a CATV signal.

10. The method of claim 9 wherein said CATV line device is a multiple CATV tap.

11. The method of claim 9 further comprising the step of aligning said openings of inserting binding collets within said contact terminals.

12. A two position bypass switching adaptor means selectively configured to fit within an existing CATV line device with board mounted circuitry and input and output ports comprising:

a bypass coupling member for electrically coupling said input port to said output port when said board mounted circuitry is removed, said bypass coupling member having first and second contact means displaceable between a first position electrically coupling with said input and output ports and a second position electrically uncoupled with said first and second ports, said contact means being maintained in said second position when said board mounted circuitry is installed and said contacts being in said first position when said board mounted circuitry is removed; and engaging means for biasing said contact means between said first and said positions wherein said contact ends are positioned to contact a rear surface of said CATV ine device in said second position.

13. The two position bypass switching adaptor means of claim 12 wherein said CATV line device is a multiple CATV tap.

14. The two position bypass switching adaptor means of claim 12 wherein said bypass coupling member is a flexible spring leaf means, said spring leaf means having two contact ends, said two contact ends being substantially curved in shape.

15. The two position bypass switching adaptor means of claim 12 further comprising:

terminal means positioned in alignment with said spring leaf means.

16. The two position bypass switching adaptor means of claim 12 wherein said engaging means includes a plurality of tabs disposed on said board mounted circuitry.

* * * * *